H. SCHWEITZER.
SOLDERING IRON FOR SOFT SOLDERING.
APPLICATION FILED MAY 3, 1910.
982,884.
Patented Jan. 31, 1911.
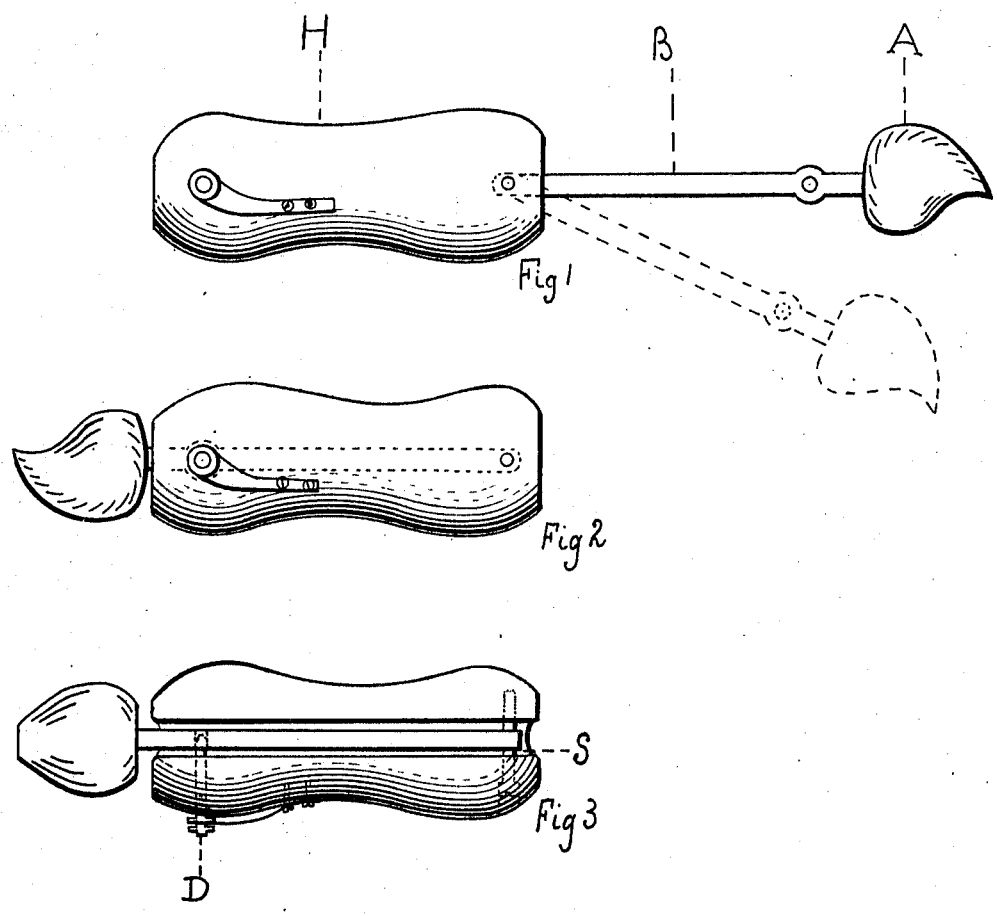
WITNESSES
INVENTOR
Heinrich Schweitzer

UNITED STATES PATENT OFFICE.

HEINRICH SCHWEITZER, OF NEW YORK, N. Y.

SOLDERING-IRON FOR SOFT-SOLDERING.

982,884.  Specification of Letters Patent.  Patented Jan. 31, 1911.

Application filed May 3, 1910. Serial No. 559,177.

*To all whom it may concern:*

Be it known that I, HEINRICH SCHWEITZER, a subject of the German Emperor, residing at New York, in the county of New York and State of New York, have invented a Soldering-Iron for Soft-Soldering, of which the following is a specification.

This soldering iron has the advantage over others that the wooden handle can be brought in a position near to the copper point while it may be easily effected to locate the handle more distantly from the copper.

Figure 1 of the accompanying drawing shows the soldering iron in a position in which the handle, H, is most distantly located from the copper bulk A. Fig. 2 and Fig. 3 indicate the position of the handle near to the copper point in different views; Fig. 2 is a lateral view taken from the same side as shown in Fig. 1; Fig. 3 shows the folded iron entered into the slot opening, S, of the handle.

In ordinary soldering irons we find a heat holding bulk of copper attached to one end of an iron rod and a wooden stationary handle at the opposite end of the rod. On account of the necessity of putting the heat accumulating copper into the fire the distance of the copper bulk from the handle was in soldering irons with stationary handles a relatively large one. This is not practical for soldering delicate metal work; it is more practical to place the copper bulk as near as possible to the hand of the operator while again it is necessary to have the handle far enough removed from the fire in heating the copper. This result can be accomplished in different ways for instance by the following construction.

As shown in the drawing the soldering iron consists of a copper bulk, A, an iron rod, B, and a handle, H. This handle, made of non-conducting material, has a slotted opening on one side extending its whole length (Fig. 3, S). The iron rod is connected in the slot near to one end of the handle by a hinge, so that if the handle is turned 180° on the hinge from the position of Fig. 1 to that of Fig. 2 and Fig. 3 the iron rod will enter the slot bringing the copper bulk near to the handle. In this position the iron rod is kept by a bolt, D, Fig. 3, projecting into the slot opening catching the iron rod and locking the iron firmly in the handle.

Having now fully described my invention I claim:

The combination in a soldering iron of a handle having a longitudinal groove along one side thereof, a rod hinged at one end to said handle adjacent to an end of said groove, a copper bulk on the other end of said rod, and means mounted in the handle for locking said rod in said groove when said rod is swung about its hinge into the groove.

HEINRICH SCHWEITZER.

Witnesses:
J. P. DAVIS,
G. H. EMSLIE.